(12) United States Patent
Yokosuka et al.

(10) Patent No.: US 6,647,189 B2
(45) Date of Patent: Nov. 11, 2003

(54) IMAGE FORMING APPARATUS HAVING AN OPTICAL FIBER ARRAY

(75) Inventors: Michio Yokosuka, Ibaraki (JP); Keiji Kataoka, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 23 days.

(21) Appl. No.: 09/841,248

(22) Filed: Apr. 25, 2001

(65) Prior Publication Data

US 2001/0036346 A1 Nov. 1, 2001

(30) Foreign Application Priority Data

Apr. 27, 2000 (JP) ........................................ 2000-127356

(51) Int. Cl.⁷ ................................................ G02B 6/04
(52) U.S. Cl. .................... 385/120; 385/116; 385/119
(58) Field of Search ................................ 385/120, 119, 385/116, 123, 49, 70; 399/219; 347/129, 134, 238

(56) References Cited

U.S. PATENT DOCUMENTS

| | | | | |
|---|---|---|---|---|
| 3,950,074 A | * | 4/1976 | Tanaka | 385/116 |
| 4,046,454 A | * | 9/1977 | Pugh, III | 385/59 |
| 4,991,930 A | * | 2/1991 | Baek et al. | 385/115 |
| 6,330,019 B1 | * | 12/2001 | Kubokawa | 347/241 |

FOREIGN PATENT DOCUMENTS

| | | |
|---|---|---|
| JP | 8-222806 | 8/1996 |
| JP | 9-113832 | 4/1998 |

* cited by examiner

*Primary Examiner*—Edward J. Glick
*Assistant Examiner*—Therese Barber
(74) *Attorney, Agent, or Firm*—Sughrue Mion, PLLC

(57) ABSTRACT

Each of optical fibers 1 includes on the outer peripheral portion thereof a plate member 2 which is used when assembling the optical fiber arrangement portion, and an optical fiber arrangement portion 29 includes an optical fiber array in which the plate members 2 of the optical fibers 1 are superimposed on top of each other in such a manner that they are arranged in parallel to each other.

11 Claims, 4 Drawing Sheets

IMAGE FORMING APPARATUS HAVING AN OPTICAL FIBER ARRAY

BACKGROUND OF THE INVENTION

1. Field of the Invention

The present invention relates to an image forming apparatus including a scanning optical system which, using a plurality of beams issued from a plurality of optical fibers, records and forms electrostatic latent images on a photosensitive member.

2. Description of the Related Art

In the field of an image forming apparatus such as a printer or copying machine, year after year, there has increased a demand that a high-precision image can be printed at a high speed. To meet this demand, in a so called laser printer, there is proposed and practically used a beam scanning apparatus in which the number of beams to scan a photosensitive member at the same time is increased and scanning is executed using two beams in a lump to form an electrostatic latent image on the photosensitive member, thereby being able to enhance the image printing speed.

However, although the above-mentioned two-beam scanning apparatus is suitable for use in a middle-speed printer which prints several dozens of pages per minute, the two-beam scanning apparatus is not effective for use fin a superhigh-speed printer which prints hundreds of pages per minute. Thus, in such superhigh-speed printer, there has been practically used a scanning apparatus using three or more beams.

Now, FIG. 7 shows an example of an image forming apparatus including a scanning apparatus using three or more beams. In this example, there is shown an image forming apparatus which uses five beams.

In FIG. 7, reference character 1 designates an optical fiber. On the one-end portions of five optical fibers, there are mounted semiconductor laser modules 28 respectively. Here, in each of the semiconductor laser modules 28, there are incorporated not only a semiconductor laser (not shown) serving as a light source but also, for example, as disclosed in JP-A-8-222806 and JP-A-9-113832, one or more lenses.

The other-end sides (that is, the sides on which the semiconductor laser modules 28 are not mounted) of the respective optical fibers are held in a lined-up manner and form an optical fiber arrangement portion 29.

Five beams, which have been emitted from the optical fiber arrangement portion 29, enter a deflector (rotary multi-surface mirror) 23 through lenses 24, 25, 26 and 27 which are respectively disposed on an optical path. The five beams, which have been reflected by the rotary multi-surface mirror 23, pass through an image forming lens 22 and scan the surface of a photosensitive member 21 collectively.

The optical fiber arrangement portion 29, as shown in FIG. 9, is composed of an optical fiber 1, a silicone base plate 31, and a glass plate 33. The optical fiber 1 is composed of a clad 13 having a outside diameter of 125 µm, and a core 12 which is used to transmit the beams and has an outside diameter of 4 µm. In the silicone base plate 31, there are formed V grooves 32 which are formed at intervals of 150 µm by the anisotropic etching of silicone crystal so that they can be used to arrange the respective optical fibers 1 in a lined-up manner. Specifically, the optical fibers 1 are put in the V grooves 32 one for one, the optical fibers 1 are respectively held by the glass plate 33, gaps formed between the silicone base plate 31 and glass plate 33 are filled with ultraviolet hardened resin 14, and the silicone base plate 31 and glass plate 33 are bonded together, thereby producing the optical fiber arrangement portion 29.

By the way, in this type of scanning apparatus using a plurality of optical fibers, the optical fiber arrangement precision is extremely important. That is, in case where the five optical fibers are arranged in a line at equal intervals, as shown in FIG. 8A, there can be obtained, on the photosensitive member, scanning lines which are disposed at equal intervals. However, in case where the arrangement precision of the optical fibers is low, as shown in FIG. 8B, the intervals between the scanning lines vary, which, of course, has ill influences on an image that is formed on the photosensitive member; that is, the quality of the image is impaired, for example, there is caused shear in the image.

SUMMARY OF THE INVENTION

The present invention aims at eliminating the above drawbacks found in the conventional image forming apparatus. Accordingly, it is an object of the invention to provide an optical fiber arrangement portion in which a plurality of optical fibers are arranged with high precision and thus realize an image forming apparatus which is capable of high quality image printing.

In attaining the above object, according to the invention, there is provided an image forming apparatus, comprising: a plurality of semiconductor laser modules each mounted on one end portion of an optical fiber for emitting a beam issued by a semiconductor laser toward the other end side of the optical fiber; an optical fiber arrangement portion for arranging therein the beam emitting ends of optical fibers respectively mounted on the semiconductor laser modules; and, a scanning optical system for recording and forming electrostatic latent images on a photosensitive member using a plurality of beams emitted from the optical fiber arrangement portion, wherein each of the optical fibers includes on the outer peripheral portion thereof a plate member to be used when assembling the optical fiber arrangement portion, and the optical fiber arrangement portion includes an optical fiber arrangement in which the plate members of the optical fibers are superimposed on top of each other in parallel to each other.

DETAILED DESCRIPTION OF THE PRESENT INVENTION

Now, the present invention on the preferred embodiments of an image forming apparatus will be described below in detail with reference to the accompanying drawings.

First Embodiment

Figure 1:
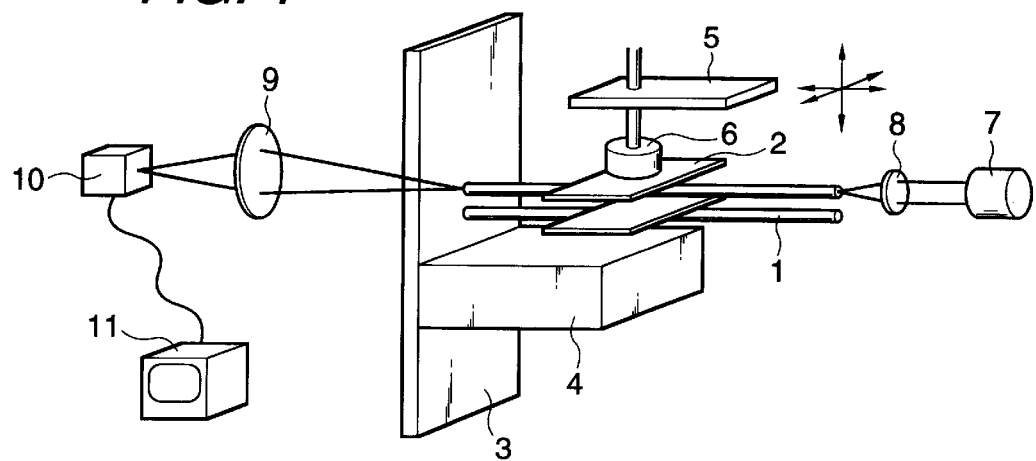
FIG. 1 is a typical view of an optical fiber arrangement portion according to the invention, showing hone to assemble it.
Figure 2:
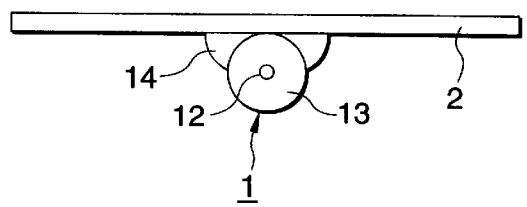
FIG. 2 is a front view of an optical fiber, showing the structure thereof.
Figure 7:
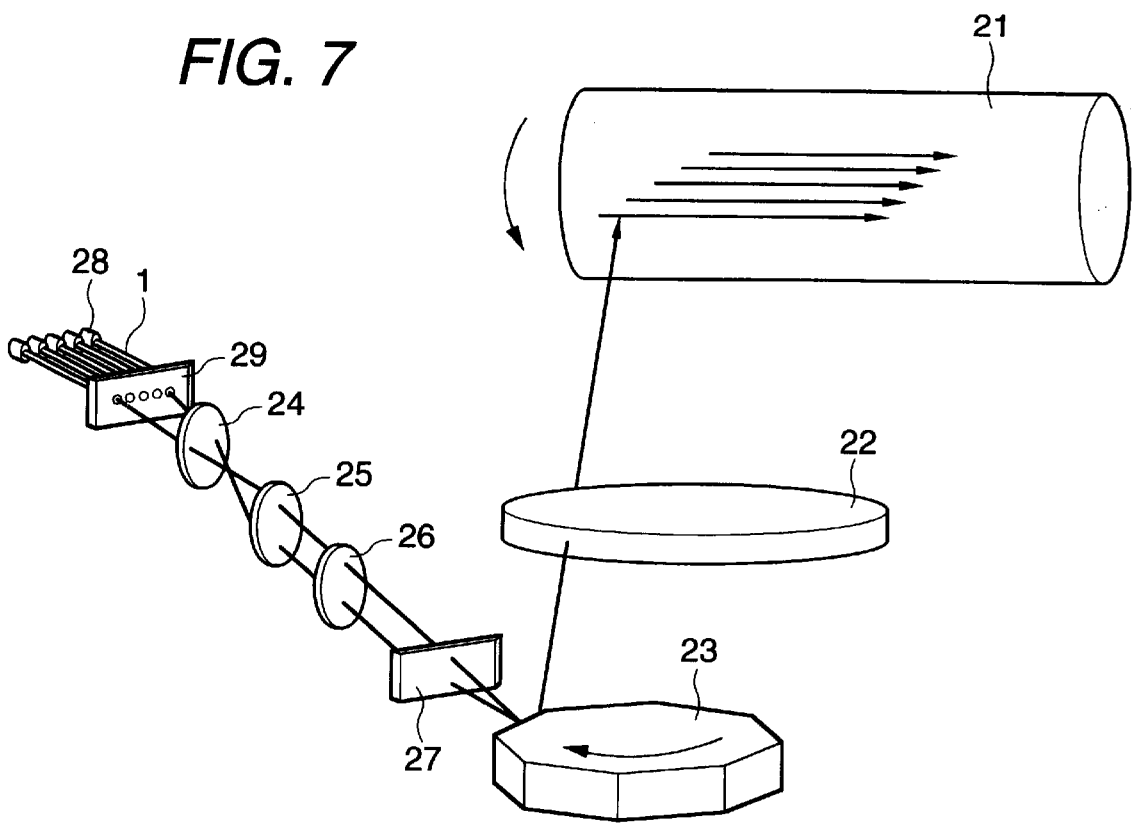
FIG. 7 is a schematic structural view of a conventional image forming apparatus.
Figure 8A:
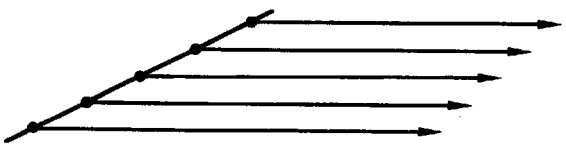
FIGS. 8A and 8B are explanatory views of the states of scanning lines formed on a photosensitive member.
Figure 8B:
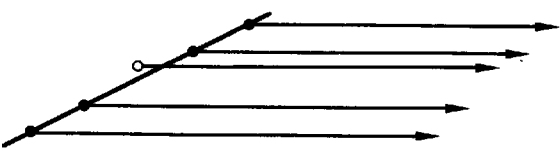
Figure 9:
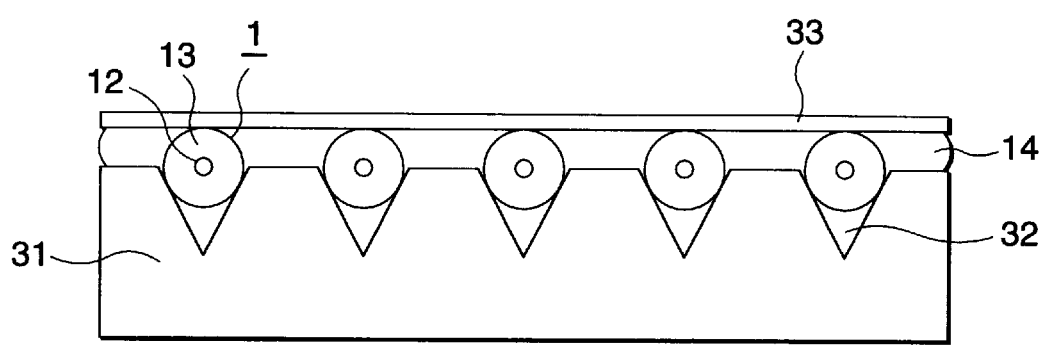
FIG. 9 is a front view of a conventional optical fiber arrangement portion.

Now, description will be given below of a first embodiment of an image forming apparatus according to the invention with reference to FIGS. 1, 2 and 3. By the way, the structure of the present image forming apparatus is equivalent to the previously described conventional structure and thus the description thereof is omitted here. FIG. 1 is a typical view of the optical fiber arrangement portion 29 shown in FIG. 7, showing how to assemble it; FIG. 2 is a front view, of an optical fiber, showing the structure thereof; and, FIG. 3 is a front view of optical fibers, showing how they are arranged.

To assemble the optical fiber arrangement portion 29, firstly, using a holding device 5, a plate member 2 for holding an optical fiber 1 is disposed on the optical fiber 1. The plate member 2 is made of, for example, a thin metal plate; and, as the material of the metal plate, there is used stainless steel, aluminum or iron. Also, the thickness of the plate member 2 is set such that, where the distance between the centers of the cores 12 of the optical fibers 1 in the optical fiber arrangement portion 29 is expressed as P and the clad diameter of the optical fiber 1 is expressed as D, the maximum thickness can satisfy P–D.

Specifically, in the present embodiment, P is 150$\mu$, D is 125$\mu$ and the maximum thickness is 25$\mu$; and, therefore, there is used a stainless plate having a thickness of 20 $\mu$m. The plate member 2 can be bonded to the optical fiber 1 with ultraviolet hardening resin or adhesive. In the present embodiment, the plate member 2 is bonded to the optical fiber using ultraviolet hardening resin 14.

Figure 3:
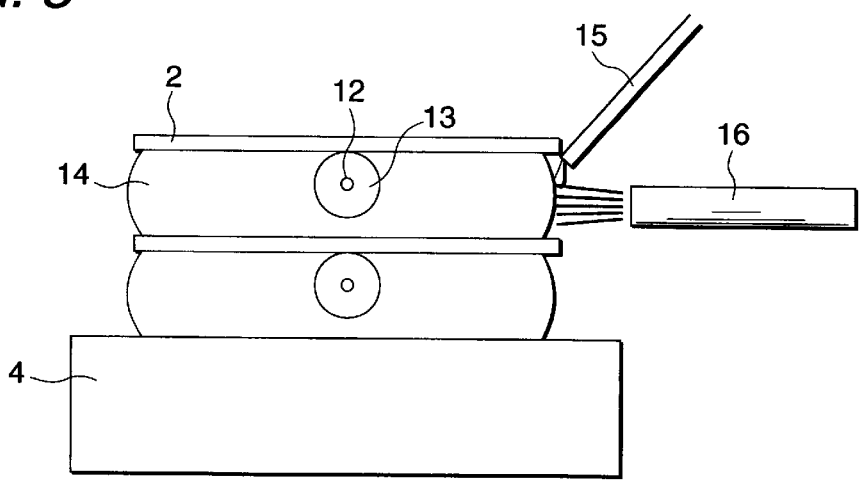
FIG. 3 is a front view of the optical fiber arrangement portion, showing how the optical fibers are arranged.

To match the positions of the optical fiber 1 and class plate 3, preliminary to the position matching operation, as shown in FIG. 3, the ultraviolet hardening resin 14 is dropped down from a nozzle 15 onto the upper surface of a base member or the upper surface of the plate member 2 previously bonded to the optical fiber 1.

Next, as shown in FIG. 1, while holding the plate member 2 using the holding device 5 which can be moved in the X, Y and Z directions and also on which either of a vacuum attracting member or a thermally melting member is mounted, the positions of the optical fiber 1 and glass plate 3 are matched to each other.

When the position matching operation is executed while holding the plate member 2 using the holding device 5 of a type that the vacuum attracting member 6 is mounted thereon, the vacuum attracting member 6 is contacted with the upper surface of the plate member of the optical fiber 1, and a negative pressure is applied to the vacuum attracting member 6 to thereby attract and hold The plate member 2. The vacuum attracting member 6 is a sucker-like attracting pad and, as the material of the vacuum attracting member 6, there can be used rubber or resin; in fact, in most cases, rubber is used. After the positions of the optical fiber 1 and glass plate 3 are matched to each other and they are bonded together, the atmospheric pressure is applied to the vacuum attracting member 6, so that the plate member 2 can be separated from the vacuum attracting member On the other hand, when the position matching operation is executed while holding the plate member 2 using the holding device 5 of a type that the thermally melting member (not shown) is mounted thereon, as the thermally melting member, solder is attached to the holding device 5, the holding device 5 with the solder attached thereto is contacted with the upper surface of the plate member 2, heat is transmitted from the holding device 5 to the solder to thereby melt the same, so that the plate member 2 is soldering connected to the holding device 5. Next, in case where the plate member 2 is cooled, the plate member 2 can be held by the holding device 5. After the positions of the optical fiber 1 and glass plate 3 are matched to each other and they are bonded together, in case where the holding device 5 is heated, the plate member 2 can be separated from the holding device 5. By the way, in the present embodiment, the plate member 2 of he optical fiber 1 is held using the holding device 5 including the former element, that is, the vacuum attracting member 6.

To match the positions of the optical fiber 1 and glass plate 3, the light, which is emitted by a light emitting device 7, is guided into the optical fiber 1 from the end face thereof after the light is narrowed by a lens 8; the light, which is transmitted through the optical fiber 1 and is emitted from the core 12 that is situated on the opposite side of the optical fiber 1, is observed from the back surface of the glass plate 3 by a monitor 11 which includes a magnifying lens 9 and a camera 10; and, the holding device 5 is moved to thereby adjust the position of the optical fiber 1. In case where the optical fiber 1 is moved to a given position of the glass plate 3, using the nozzle 15, the ultraviolet hardening resin 14 is dropped down into between the optical fiber 1 and glass plate 3. After drop-down of the ultraviolet hardening resin 14, using a lamp 16, the light including ultraviolet light rays is radiated onto the ultraviolet hardening resin 14 between the plate member 2, optical fiber 1 and glass plate 3 to thereby harden the ultraviolet hardening resin 14. Due to this, the optical fiber 1, glass plate 3 and plate member 2 are bonded together.

At the then time, since the optical fiber 1 is arranged in the vertical direction, the ultraviolet hardening resin 14 dropped down onto the optical fiber 1 is allowed to flow down below the optical fiber 1. Thus, The ultraviolet hardening resin 14 has no influence on an optical fiber 1 to be arranged next but rather reinforces the bonded portion of the previously bonded optical fiber 1. By the way, adhesive can also be used instead of the ultraviolet hardening resin 14, or bonding between the optical fiber 1 and glass plate 3 can also be achieved using laser welding.

By repeating the above operations, the optical fibers 1 each with two or more plate members 2 can be arranged vertically and thus there can be obtained a vertical optical fiber arrangement portion. After a given number of optical fibers are arranged, a plurality of optical fibers 1 situated in the rear of the plate members 2 are bonded and fixed together using ultraviolet hardening resin (not shown) or adhesive (not shown).

By means of the above operations, there is manufactured a high-precision optical fiber arrangement portion which is composed of ten optical fibers and in which the distance between the cores 12 of the optical fibers is 150 $\mu$m (=P). Also, according to the present embodiment, it is possible to manufacture an optical fiber arrangement portion which is composed of 2 to 10 optical fibers or more .

In case where the thus manufactured optical fiber arrangement portion is used while inclining it at a required angle, scanning lines can be formed at regular intervals on the photosensitive member 21 using a plurality of beams emitted from the optical fiber arrangement portion, which makes it possible to attain high-quality printing.

Second Embodiment

Figure 4:
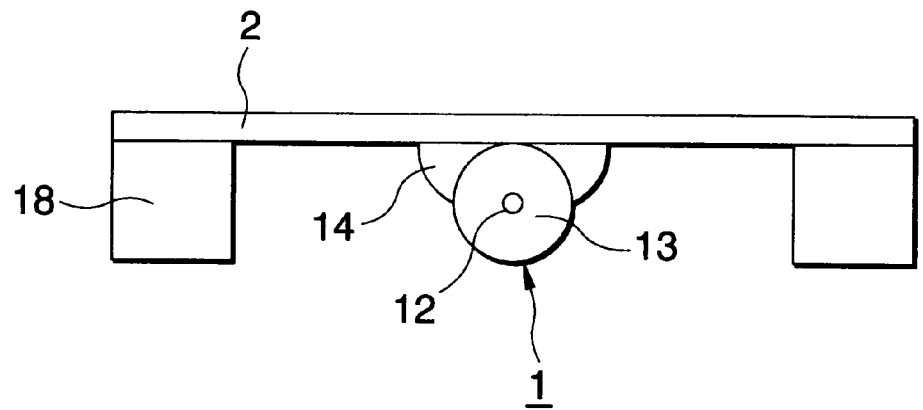
FIG. 4 is a front view of a second embodiment of an optical fiber arrangement portion according to the invention.

Now, FIG. 4 shows a second embodiment of an image forming apparatus according to the invention. The second embodiment is different from the first embodiment in that, to the optical fiber 1, there is bonded a plate member which is formed by bonding a reinforcing member 18 formed of metal or glass to the plate member 2 according to the first embodiment using ultraviolet hardening resin (not shown) or adhesive (not shown) According to the present embodiment, in the bonding operation of the optical fiber 1, the optical fiber 1 and reinforcing member 18 are bonded to the glass plate 3 shown in FIG. 1. The other remaining operations of the second embodiment are similar to those of the first embodiment. Thanks to the above, the bonding strength of the optical fiber 2 can be enhanced and thus a high-precision optical fiber arrangement portion can be obtained. Also, in case where an image is formed using the thus manufactured optical fiber arrangement portion, scanning lines can be formed at regular intervals on the photosensitive member 21 and also it can be confirmed that the printed image is of high quality.

Third Embodiment

Figure 5:
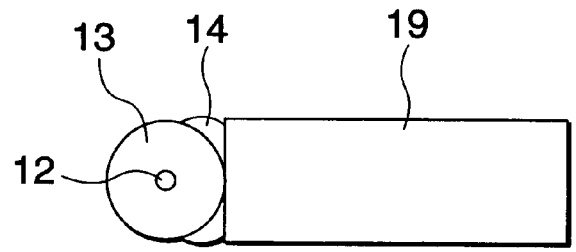
FIG. 5 is a front view of a third embodiment of an optical fiber arrangement portion according to the invention.
Figure 6:
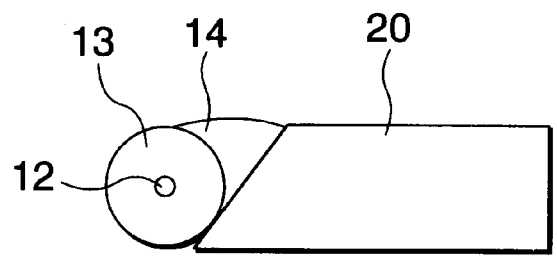
FIG. 6 is a front view of a modification of the third embodiment of an optical fiber arrangement portion according to the invention.

Now, FIGS. 5 and 6 show a third embodiment of an image forcing apparatus according to the invention. In the third embodiment, to the side surface of the optical fiber 1, there is fixed a plate member 19 made 20 a glass plate or a metal plate, having a vertical end face and having a thickness equal to or smaller than the clad diameter of the optical fiber 1, or a plate member 20 having an inclined end face and having the same thickness as the plate member 19 using ultraviolet hardening resin 14 or adhesive, or using laser welding; and, the plate member 19 or 20 is disposed horizontally with respect to the optical fiber 1 and is then held by the holding device 5 according to the first embodiment. After then, by carrying out the same operations as in the first embodiment, there can be obtained a high-precision optical fiber arrangement portion having a small distance between the cores 12. In case where an image is formed using the thus manufactured optical fiber arrangement portion, scanning lines can be formed at regular intervals on the photosensitive member 21 and also it can be confirmed that the printed image is of high quality.

As has been described heretofore, according to the invention, there can be provided an optical fiber arrangement portion in which a plurality of optical fibers are arranged with high precision, and thus there can be realized an image forming apparatus capable of high quality printing.

What is claimed is:

1. An image forming apparatus comprising:
    a plurality of optical fibers each having a first end and second end;
    a plurality of semiconductor laser modules each mounted on the first end of each of the optical fibers, the plurality of semiconductor laser modules for emitting a beam emitted from a semiconductor laser toward the second end of each of the optical fibers;
    an optical fiber arrangement portion for arranging therein the second ends of the optical fibers; and
    a scanning optical system for recording and forming an electrostatic latent image on a photosensitive member using a plurality of beams emitted from the optical fiber arrangement portion;
    wherein the optical fiber arrangement portion comprises a plurality of plate members adhered to the outer peripheral portion of the optical fibers, respectively, and the plurality of plate members is used when the optical fiber arrangement portion is assembled;
    wherein the plate members are directly superposed on one another and in parallel to each other to form an optical fiber array in the optical fiber arrangement portion; and
    wherein each plate member corresponds to each optical fiber (one to one).

2. The image forming apparatus as claimed in claim 1 wherein the optical fiber arrangement portion further comprises a plurality of bonding layers disposed between the adjacent plate members, the bonding layers for fixing the outer peripheral portion of the optical fibers to the plate members, respectively.

3. The image forming apparatus as claimed in claim 2, wherein each of the bonding layers is made of ultraviolet hardening resin.

4. The image forming apparatus as claimed in claim 2, wherein each of the bonding layers is made of adhesive.

5. The image forming apparatus as claimed in claim 1 further comprising a plurality of reinforcing members each disposed between the adjacent plate members.

6. The image forming apparatus as claimed in claim 1, wherein the plate members are made of metal.

7. An optical fiber array comprising:
    a plurality of optical fibers;
    a plurality of plate members attached to the plurality of optical fibers, respectively; and
    a plurality of bonding layers disposed between the adjacent plate members, the bonding layers for bonding the adjacent plate members to each other,
    wherein the plurality of plate members are in parallel to each other; and
    wherein each plate member corresponds to each optical fiber (one to one).

8. The optical fiber array as claimed in claim 7 wherein each of the bonding layers is made of ultraviolet hardening resin.

9. The optical fiber array as claimed in claim 7 wherein each of the bonding layers is made of adhesive.

10. The optical fiber array as claimed in claim 7 further comprising a plurality of reinforcing members each disposed between the adjacent plate members.

11. The optical fiber array as claimed in claim 7 wherein the plate members are made of metal.

* * * * *